N. LARSEN.
CALCULATOR.

No. 183,403. Patented Oct. 17, 1876.

2 Sheets—Sheet 1.

Witnesses:
Uriah Bruner
F. W. Ragoss

Inventor
Niels Larsen

2 Sheets—Sheet 2.
N. LARSEN.
CALCULATOR.
No. 183,403. Patented Oct. 17, 1876.
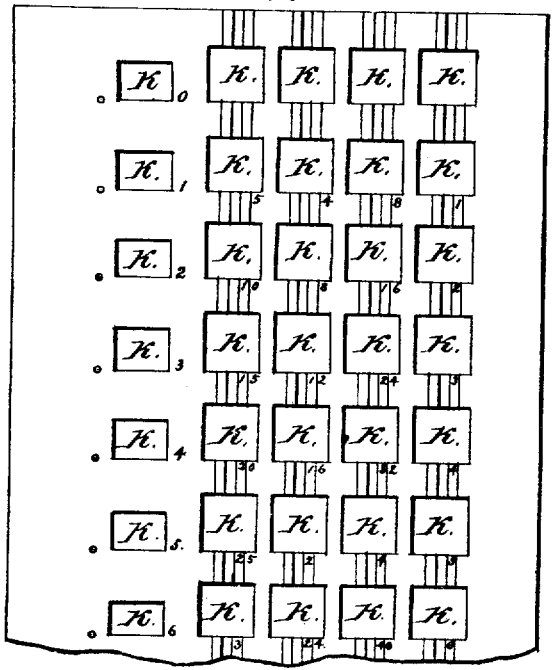
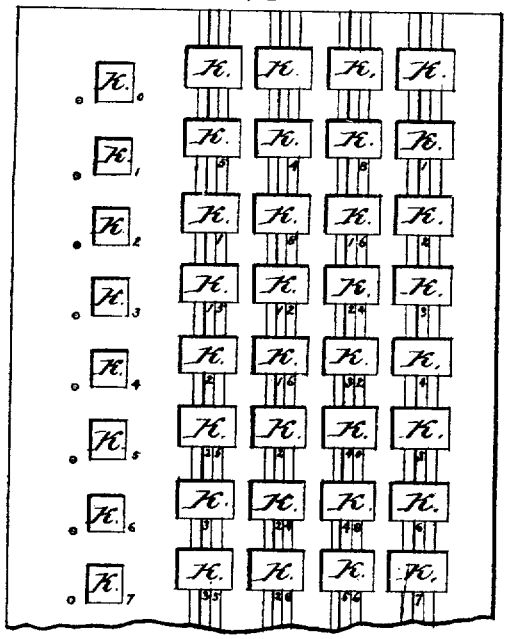
Witnesses:
Uriah Bruner
F. W. Ragods
Inventor:
Niels Larsen

UNITED STATES PATENT OFFICE.

NIELS LARSEN, OF WEST POINT, NEBRASKA.

IMPROVEMENT IN CALCULATORS.

Specification forming part of Letters Patent No. 183,403, dated October 17, 1876; application filed June 15, 1876.

*To all whom it may concern:*

Be it known that I, NIELS LARSEN, of West Point, in the county of Cuming and State of Nebraska, have invented a new and Improved Tax and Interest Calculator; and I do hereby declare that the following is a full, clear, and exact description of the same, reference being had to the accompanying drawing, forming part of this specification.

The present invention has reference to an instrument or apparatus for calculating taxes and interest with speed and accuracy.

The invention consists, essentially, in the combination of three concentric cylinders, which are movable independently of each other, and the two outer ones provided with openings, allowing portions of each cylinder to be seen.

The cylinders bear numbers or figures—the inner cylinder representing hundreds, the middle one tens, and the outer one units. By properly moving the cylinders the tax or interest upon a given sum or amount will be exhibited through a stationary shield, as will be hereinafter more fully described.

Figure 1:
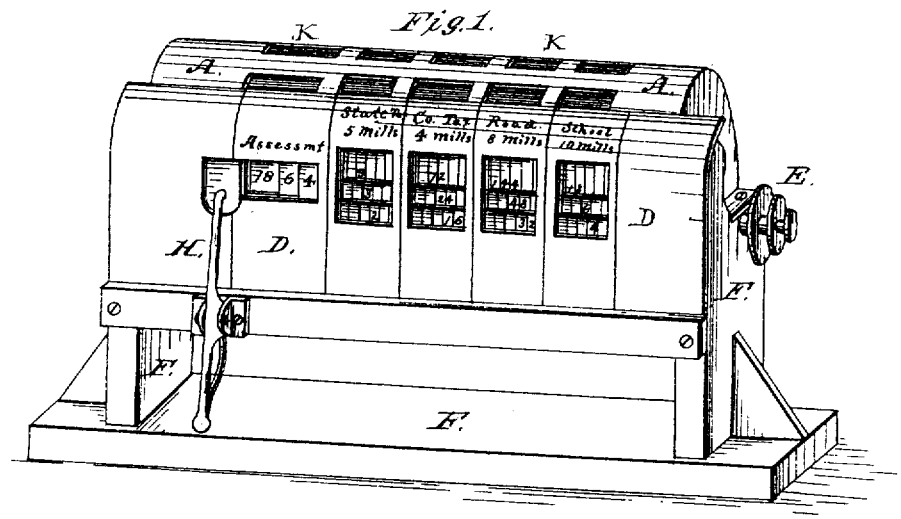
Figure 2:
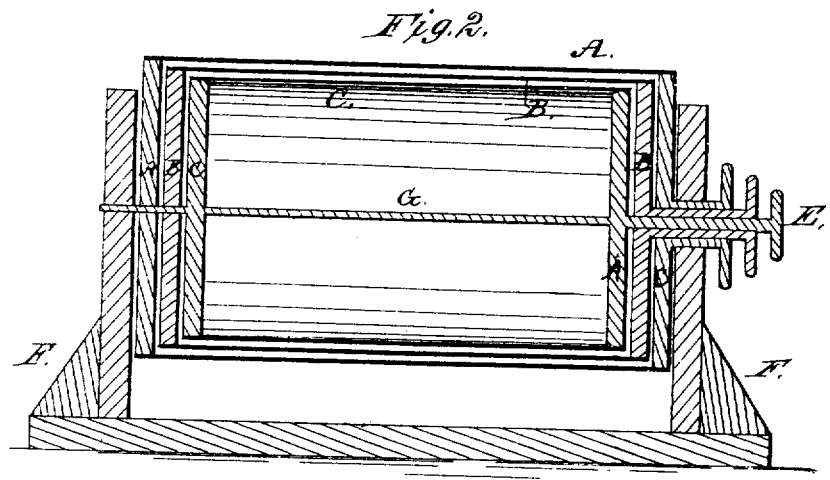
Figure 3:
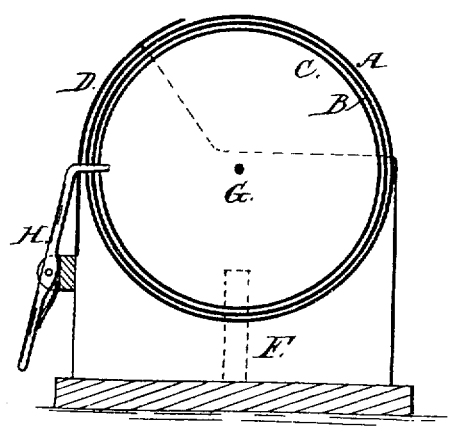

In the accompanying drawing, Figure 1 is a perspective view of my calculating-machine. Fig. 2 is a longitudinal section of the same. Fig. 3 is a cross-section. Figs. 4, 5, and 6 are detail views indicating the arrangement of numbers on the calculating-cylinders.

Letter F denotes a stand or frame, which carries a stationary perforated shield, on which the name of tax or the number of days or months for interest is written or inscribed.

In rear of the shield are arranged three concentric cylinders, A B C, which are capable of receiving each an independent movement or rotation. The inner cylinder is fixed on a shaft or axis, G, which has its bearings in the side pieces of the stand F. The middle and outer cylinders are provided with sleeves, which are movable upon each other and the shaft G, and both the shaft and sleeves are provided with milled heads E for rotating the cylinders.

The different cylinders bear numbers or figures, which are arranged as shown in Figs. 4, 5, and 6.

As shown in Fig. 4, the amount upon which tax or interest has to be calculated is placed one line above the tax or interest; in Fig. 5, on the same line, and in Fig. 6 one line below, by which arrangement the amount upon which tax or interest is calculated stands in one line, and the tax or interest in three lines, one above the other, as shown in Fig. 1.

The shield F, as already stated, bears the name of the tax, or the number of days or months for interest, and it is perforated in such a manner as to expose to sight only the amount upon which tax or interest is to be calculated, and the amount of the tax or interest.

The different cylinders A B C indicate, respectively, units, tens, and hundreds, and the figures and lines on the same may be marked directly upon the cylinders, or upon paper strips fastened to the same.

The two outer cylinders are provided with openings K, which are so shaped and arranged in relation to each other that the figures on the inner and middle cylinders will show through the openings of the outer one, as is illustrated in Fig. 1 of drawing.

A pivoted spring-catch, H, on the stand F is employed to retain the cylinders in a stationary position after they have been properly adjusted or set. The spring-catch enters holes formed in the cylinders, as shown.

The operation of the machine for calculating taxes is as follows: To determine the tax on an assessment of seven hundred and sixty-four dollars, bring the figure 4 on the outside or unit cylinder to view in the opening of the shield under the word "assessment," and let the spring-catch hold that cylinder. Now bring the figure 6 on the middle cylinder to view in the same opening, and in line with the figure 4 on the first cylinder, and let the spring-catch also hold the middle cylinder. Now, by bringing the figure 7 on the third cylinder to view in the same manner, the amount of the assessment can be read. This having been done, we find in the appropriate column for each kind of special tax indicated on the shield three lines of figures—those on the outer cylinder representing the tax on four dollars, those on the second cylinder the tax on sixty dollars, and those on the third cylinder the tax on seven hundred dollars. The three sums are then added together mentally by the person using the machine, and entered in the tax-list.

In order to have the assessment on one line the taxes on the outer cylinder are placed below, and those on the inner cylinder above, the assessment.

Having thus described my invention, what I claim as new is—

The combination of the concentric numbered and independently-movable cylinders A B C with the perforated shield D and a suitable locking device, substantially as set forth.

NIELS LARSEN.

Witnesses:
 F. W. RAGOSS,
 URIAH BRUNER.